(12) United States Patent
Kubota

(10) Patent No.: US 11,117,288 B2
(45) Date of Patent: Sep. 14, 2021

(54) MONTMORILLONITE SLURRY, CLAY FILM AND METHOD OF PRODUCING MONTMORILLONITE SLURRY

(71) Applicant: KUNIMINE INDUSTRIES CO., LTD., Tokyo (JP)

(72) Inventor: Munehiro Kubota, Iwaki (JP)

(73) Assignee: KUNIMINE INDUSTRIES CO., LTD., Tokyo (JP)

(*) Notice: Subject to any disclaimer, the term of this patent is extended or adjusted under 35 U.S.C. 154(b) by 0 days.

(21) Appl. No.: 16/060,889

(22) PCT Filed: Oct. 20, 2017

(86) PCT No.: PCT/JP2017/038029
§ 371 (c)(1),
(2) Date: Jun. 8, 2018

(87) PCT Pub. No.: WO2018/092512
PCT Pub. Date: May 24, 2018

(65) Prior Publication Data
US 2019/0009431 A1    Jan. 10, 2019

(30) Foreign Application Priority Data
Nov. 21, 2016  (JP) .............................. JP2016-226341

(51) Int. Cl.
*B28C 1/04* (2006.01)
*C01B 33/40* (2006.01)
(Continued)

(52) U.S. Cl.
CPC ............... *B28C 1/04* (2013.01); *B01J 39/14* (2013.01); *B01J 47/016* (2017.01); *C01B 33/40* (2013.01); *B01J 39/09* (2017.01)

(58) Field of Classification Search
CPC .... B28C 1/04; B01J 39/09; B01J 39/14; B01J 47/016; C01B 33/40
See application file for complete search history.

(56) References Cited

U.S. PATENT DOCUMENTS

2014/0276484 A1* 9/2014 Mukhopadhyay ...... A61L 15/44
604/307

FOREIGN PATENT DOCUMENTS

JP    2008-247719 A    10/2008
JP    2009-107907 A     5/2009
(Continued)

OTHER PUBLICATIONS

International Search Report for PCT/JP2017/038029 (PCT/ISA/210) dated Jan. 9, 2018.
(Continued)

*Primary Examiner* — Pegah Parvini
*Assistant Examiner* — Ross J Christie
(74) *Attorney, Agent, or Firm* — Birch, Stewart, Kolasch & Birch, LLP

(57) ABSTRACT

A montmorillonite slurry, containing a lithium-immobilized montmorillonite having a cation exchange capacity of 50 meq/100 g or less, ammonia, water, and an organic solvent, in which the organic solvent includes at least one kind of organic solvent selected from the group consisting of acetonitrile and methyl ethyl ketone, the proportion occupied by the organic solvent in the total amount of the water and the organic solvent in the slurry is 10% by mass or more and 90% by mass or less, and the content of ammonia in the slurry is 0.1 mmol or more per gram of the lithium-immobilized montmorillonite in the slurry;
a method of producing the same; and
a clay film.

6 Claims, 2 Drawing Sheets

(51) Int. Cl.
  B01J 47/016 (2017.01)
  B01J 39/14 (2006.01)
  B01J 39/09 (2017.01)

(56) References Cited

FOREIGN PATENT DOCUMENTS

| JP | 2010-95440 A | | 4/2010 |
|---|---|---|---|
| JP | 2015-147300 A | | 8/2015 |
| JP | 2015147300 A | * | 8/2015 |
| JP | 2016-141603 A | | 8/2016 |
| JP | 2016-169135 A | | 9/2016 |

OTHER PUBLICATIONS

Written Opinion of the International Searching Authority for PCT/JP2017/038029 (PCT/ISA/237) dated Jan. 9, 2018.

* cited by examiner

MONTMORILLONITE SLURRY, CLAY FILM AND METHOD OF PRODUCING MONTMORILLONITE SLURRY

TECHNICAL FIELD

The present invention relates to a slurry formed by stably dispersing lithium-immobilized montmorillonite having a low cation exchange capacity and low water-dispersibility, and a clay film that uses the slurry, and a method of producing a montmorillonite slurry.

BACKGROUND OF THE INVENTION

Industrial clays are utilized in a variety of fields such as thickeners, caking agents, rheology modifiers, inorganic binders, muddy construction water agents, water stopping materials, and cosmetic raw materials.

One known industrial clay is montmorillonite. Crystal structure of montmorillonite typically consists of unit crystal of 2:1 layer structure, in which an octahedral alumina sheet is sandwiched between tetrahedral silicate sheets of extended networks of silicate. In many cases, part of the aluminum that is the central atom of the octahedral alumina sheet of this crystal layer is substituted by magnesium that negatively charges the crystal layer, and a cation is incorporated between the layers in a way that neutralizes this negative charge. Furthermore, since this cation can be ion exchanged, montmorillonite exhibits cation exchangeability. The sum total of exchangeable cations is referred to as cation exchange capacity (CEC) and is an index representing an important property of montmorillonite.

It is known that when montmorillonite is subjected to heating treatment, the interlayer cation (proton, sodium ion, potassium ion, lithium ion, cesium ion, ammonium ion, calcium ion, magnesium ion, or the like) is immobilized as a result of dehydration. When the cation is immobilized, the basic properties of montmorillonite, such as dispersion stability in water, thickenability, swellability, and cation exchangeability, are degraded. In particular, lithium ion is immobilized by applying a temperature of about 200° C. or higher. Therefore, a montmorillonite containing a certain amount or more of interlayer lithium ions undergoes considerable deterioration of cation exchangeability during the aforesaid heating treatment, and even if water is added, the montmorillonite is not restored to the original state, while water-dispersibility is markedly decreased. It is thought that immobilization of lithium ions caused by heating treatment occurs as the interlayer lithium ions migrate into the montmorillonite crystal lattice to occupy vacancies of the octahedral sheet. This phenomenon, known as the Hofmann-Klemen effect, has been utilized to control layer charge density (see, for example, Non-Patent Literature 1).

It has been reported that functionality of montmorillonite is increased by utilizing lithium ion immobilization caused by heating treatment as described above. For example, Patent Literatures 1 and 2 describe that a clay film having excellent water resistance (water vapor barrier properties) is obtained by forming a film using an aqueous dispersion liquid of a montmorillonite having interlayer lithium ions, and then subjecting this film to heating treatment in a dryer.

However, as lithium type montmorillonite that has been once heated is not easily detached and dispersed again particularly in a single solvent, such a montmorillonite is detached and dispersed in a mixed solvent system. For this reason, Patent Literature 3 reports that lithium montmorillonite can be slurrified by dispersion in a mixed solvent composed of water, a polar organic solvent including a formamide group, and ammonia.

CITATION LIST

Patent Literature

Patent Literature 1: JP-A-2008-247719 ("JP-A" means unexamined published Japanese patent application)
Patent Literature 2: JP-A-2009-107907
Patent Literature 3: JP-A-2015-147300

Non-Patent Literature

Non-Patent Literature 1: "HANDBOOK OF CLAYS AND CLAY MINERALS", Third Edition, edited by the Clay Science Society of Japan, May 2009, p. 125

DISCLOSURE OF INVENTION

Technical Problem

A montmorillonite having a certain amount or more of interlayer lithium ions undergoes degradation of cation exchangeability and/or dispersibility in water when subjected to a heating treatment at a temperature higher than or equal to a particular temperature as described above. This makes it difficult to prepare an aqueous dispersion liquid and form a film. In fact, the water-resistant clay films described in Patent Literatures 1 and 2 are produced by forming a film using an aqueous dispersion liquid of a montmorillonite having interlayer lithium ions, and then heating this film in a dryer at high temperature to immobilize the lithium ions. However, in the methods described in Patent Literatures 1 and 2, it is necessary to form a film first and then subject the film to a heating treatment, so that increase of production efficiency is limited.

Furthermore, in Patent Literature 3, a lithium type montmorillonite is subjected to programmed heating in advance so as to condition the montmorillonite into a montmorillonite having high water resistance (low cation exchangeability and/or water-dispersibility), and the montmorillonite is then slurrified using a mixed solvent so that molding can be easily achieved. However, from the aspect of practical use, the high-boiling point solvent having a formamide group, which is used at the time of slurrification, is likely to remain between the clay layers even after drying, and a heating temperature higher than or equal to the boiling point is required for the removal of the solvent by heating and drying.

The present invention is contemplated for providing a montmorillonite slurry formed by stably dispersing a lithium-immobilized montmorillonite, in which lithium ions are immobilized and cation exchangeability and water-dispersibility have been reduced, the montmorillonite slurry being dryable at low temperature; a clay film that can be dried at low temperature and has high water resistance and excellent production efficiency, the clay film using the slurry described above; and a method of producing a montmorillonite slurry.

Solution to Problem

The inventors of the present invention repeatedly conducted thorough investigations in view of the problems described above. As a result, the inventors found that when a lithium-immobilized montmorillonite powder degraded in water-dispersibility by heating treatment is mixed into a water-miscible solvent including a particular amount of ammonia and containing either of acetonitrile and methyl ethyl ketone, a slurry having the lithium-immobilized montmorillonite stably dispersed and having excellent stability over time is obtained. The present invention is based on these findings, and the inventors further repeated investigations and finally completed the invention.

The above-described object of the present invention was achieved by the following means.

[1] A montmorillonite slurry, containing:
a lithium-immobilized montmorillonite having a cation exchange capacity of 50 meq/100 g or less;
ammonia;
water; and
an organic solvent,
wherein the organic solvent includes at least one kind of organic solvent selected from the group consisting of acetonitrile and methyl ethyl ketone,
wherein the proportion occupied by the organic solvent in the total amount of the water and the organic solvent in the slurry is 10% by mass or more and 90% by mass or less, and
wherein the content of ammonia in the slurry is 0.1 mmol or more per gram of the lithium-immobilized montmorillonite in the slurry.

[2] The montmorillonite slurry described in the above item [1], wherein the lithium-immobilized montmorillonite is obtained by subjecting a lithium type montmorillonite to a heating treatment at 180° C. to 600° C.

[3] A clay film using the montmorillonite slurry described in the above item [1] or [2].

[4] A method of producing a montmorillonite slurry, which contains mixing at least a lithium-immobilized montmorillonite having a cation exchange capacity of 50 meq/100 g or less, ammonia, water, and an organic solvent,
wherein the organic solvent includes at least one kind of organic solvent selected from the group consisting of acetonitrile and methyl ethyl ketone,
wherein the proportion occupied by the organic solvent in the total amount of the water and the organic solvent in the slurry is 10% by mass or more and 90% by mass or less, and
wherein the mixing amount of ammonia is 0.1 mmol or more per gram of the lithium-immobilized montmorillonite.

[5] The method of producing a montmorillonite slurry described in the above item [4], wherein the lithium-immobilized montmorillonite is obtained by subjecting a lithium-type montmorillonite to a heating treatment at 180° C. to 600° C.

[6] The method described in the above item [4] or [5], wherein an aqueous ammonia solution is mixed as the ammonia.

Advantageous Effects of Invention

The montmorillonite slurry of the present invention (hereinafter, simply referred to as "slurry of the present invention") is a slurry having excellent stability over time, in which a lithium-immobilized montmorillonite having cation exchangeability at or below a particular level and having low water-dispersibility is stably dispersed.

The clay film of the present invention is a film formed using the slurry of the present invention. Even when dried at a low temperature of 150° C. or lower, the clay film of the present invention has high water resistance. Further, the clay film of the present invention has excellent production efficiency.

According to the production method of the present invention, a slurry formed by stably dispersing a lithium-immobilized montmorillonite having cation exchangeability at or below a particular level and having low water-dispersibility, can be obtained.

Other and further features and advantages of the invention will appear more fully from the following description, appropriately referring to the accompanying drawings.

MODE FOR CARRYING OUT THE INVENTION

<Montmorillonite Slurry of the Present Invention>

Figure 1:
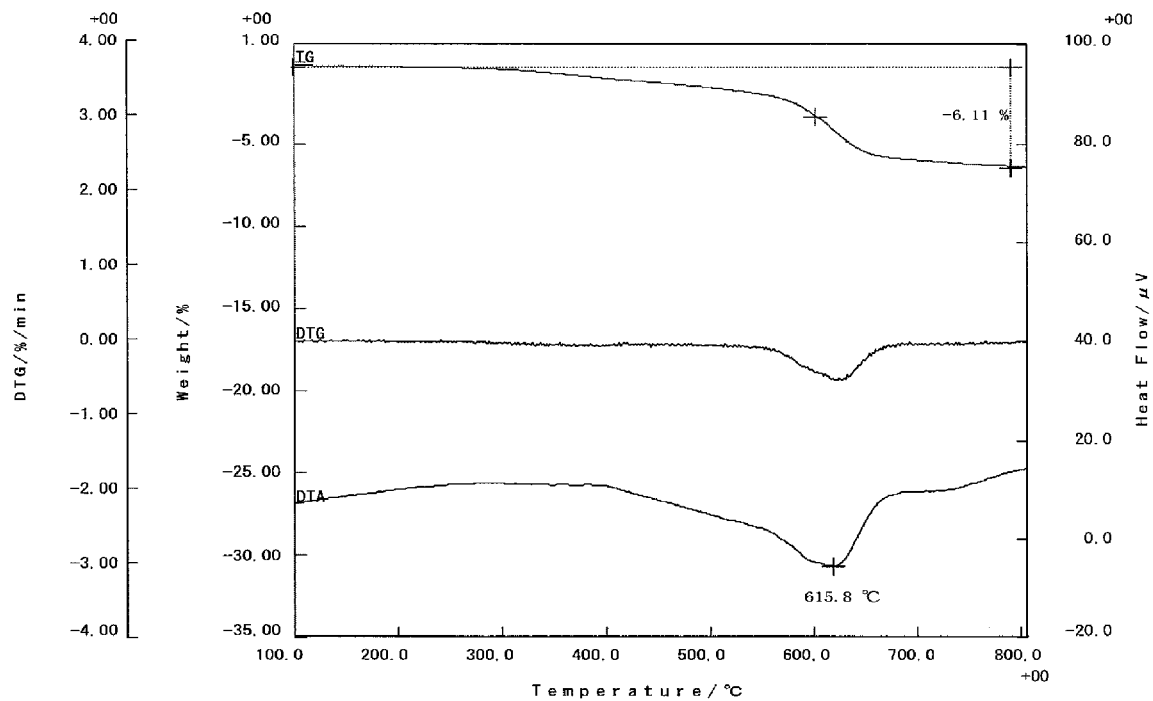
FIG. 1 is an analytic chart of thermogravimetry-differential thermal analysis (TG/DTA) for a dried powder of Li-immobilized montmorillonite as a starting raw material used in Examples.

The montmorillonite slurry of the present invention contains a lithium-immobilized montmorillonite having cation exchange capacity of 50 meq (mili equivalent)/100 g or less, ammonia, water, and an organic solvent.

In addition, in the present invention, the organic solvent described above contains at least one kind of organic solvent selected from the group consisting of acetonitrile and methyl ethyl ketone.

The montmorillonite slurry of the present invention is a slurry in which a lithium-immobilized montmorillonite incorporated therein is stably dispersed.

The various components that constitute the montmorillonite slurry of the present invention will be explained below in detail.

(Lithium-Immobilized Montmorillonite)

The lithium-immobilized montmorillonite used for the present invention can be obtained by immobilizing the lithium ions (Li$^+$) existing between the layers of the crystal structure of a lithium type montmorillonite, through a heating treatment described below, or the like.

In the present specification, "lithium type montmorillonite" is a montmorillonite in which the proportion occupied by the amount of lithium ions (that is, amount of leaching lithium ions, unit: meq/100 g; hereinafter, the same) in the amount of leaching cations (that is, total amount of leaching cations, unit: meq/100 g; hereinafter, the same) of the montmorillonite is 60% or more. The montmorillonite is a montmorillonite in which the amount of leaching lithium ions occupies preferably 70% or more, and more preferably 80% or more, of the amount of leaching cations. The proportion of the amount of leaching lithium ions in the amount of leaching cations of the lithium type montmorillonite may be 100%. However, the amount of leaching lithium ions is usually 99% or less. In addition, the "lithium type montmorillonite" according to the present specification is a montmorillonite having a cation exchange capacity of more than 50 meq/100 g. The cation exchange capacity of the lithium type montmorillonite is preferably 60 to 150 meq/100 g, more preferably 70 to 120 meq/100 g, and further preferably 80 to 110 meq/100 g.

In the present specification, "lithium-immobilized montmorillonite" is a montmorillonite having a cation exchange capacity of 50 meq/100 g or less. The cation exchange capacity of the lithium-immobilized montmorillonite is preferably 5 to 50 meq/100 g, more preferably 10 to 40 meq/100 g.

The "lithium-immobilized montmorillonite" according to the present specification is such that the difference (unit: meq/100 g) between the amount of leaching lithium ions of the lithium type montmorillonite used as a raw material in the production of the lithium-immobilized montmorillonite (as explained above, a lithium-immobilized montmorillonite can be obtained by subjecting a lithium type montmorillonite to a heating treatment that will be described below) and the amount of leaching lithium ions of the lithium-immobilized montmorillonite is preferably 60% or more, more preferably 60% to 99%, and further preferably 65% to 95%, of the cation exchange capacity (unit: meq/100 g) of the lithium type montmorillonite used as the raw material.

The lithium-immobilized montmorillonite used in the present invention is preferably in a powder form.

Furthermore, the lithium-immobilized montmorillonite usually contains sodium ions ($Na^+$), potassium ions ($K^+$), magnesium ions ($Mg^+$), calcium ions ($Ca^+$), and the like in addition to lithium ions, as leaching cations. In regard to the lithium-immobilized montmorillonite used for the present invention, the amount of leaching ions of $Na^+$, $K^+$, $Mg^+$, and $Ca^+$ is, as the total amount, preferably 1 to 30 meq/100 g, more preferably 1 to 20 meq/100 g, and further preferably 1 to 10 meq/100 g.

The cation exchange capacity of montmorillonite can be measured by a method equivalent to Schollenberger's method ("HANDBOOK OF CLAYS AND CLAY MINERALS", Third Edition, edited by the Clay Science Society of Japan, May 2009, p. 453-454). More specifically, the cation exchange capacity can be measured by the method described in Japan Bentonite Manufacturers Association Standard JBAS-106-77.

The amount of leaching cations of montmorillonite can be calculated by leaching the interlayer cations of montmorillonite using 100 mL of a 1 M aqueous solution of ammonium acetate with respect to 0.5 g of montmorillonite for 4 hours or longer, and measuring the concentrations of various cations in the obtained solution by means of ICP emission spectroscopy or atomic absorption spectroscopy.

The lithium-immobilized montmorillonite used for the present invention can be obtained by subjecting a lithium type montmorillonite to a heating treatment and immobilizing the lithium ions existing between layers of the crystal structure.

A lithium type montmorillonite can be obtained by adding a lithium salt, such as lithium hydroxide and lithium chloride, to a dispersion liquid of naturally occurring sodium type montmorillonite, and performing cation exchange. The proportion occupied by the amount of lithium ions in the amount of leaching cations of the lithium type montmorillonite thus obtainable can be appropriately regulated by regulating the amount of lithium that is added to the dispersion liquid. Furthermore, a lithium type montmorillonite can also be obtained by a column method of using a resin obtained by subjecting a cation exchange resin to ion exchange with lithium ions, or a batch method.

Furthermore, a lithium type montmorillonite is commercially available. Examples of commercially available products of lithium type montmorillonite include KUNIPIA-M (trade name, manufactured by Kunimine Industries Co., Ltd.).

The lithium-immobilized montmorillonite used for the present invention has low cation exchangeability and low water-dispersibility compared to a lithium type montmorillonite. This is speculated to be because, in a lithium-immobilized montmorillonite, when lithium ions migrate to the vacancies of the octahedral sheet of clay crystals and are immobilized, the clay crystals are electrically neutralized and are brought into a state in which the space between layers is compactly closed, and thus water molecules cannot easily enter (hydration of interlayer cations does not easily occur).

In a case in which a lithium-immobilized montmorillonite is produced by subjecting a lithium type montmorillonite to a heating treatment, the temperature conditions for the heating treatment are not particularly limited as long as a lithium type montmorillonite can be converted to a lithium-immobilized montmorillonite. From the viewpoint of efficiently immobilizing lithium ions and significantly decreasing the cation exchange capacity, it is preferable to heat the lithium type montmorillonite at a temperature higher than or equal to 150° C. The temperature upon the heat treatment is more preferably 150 to 600° C., further preferably 180 to 600° C., particularly preferably 200 to 500° C., and most preferably 300 to 500° C. By heating at the above-mentioned temperature, the cation exchange capacity can be more efficiently decreased, and also, a dehydration reaction of a hydroxyl group in montmorillonite, or the like can be suppressed. It is preferable that the heating treatment is carried out in an open type electric furnace. In this case, the relative humidity at the time of heating becomes 5% or less, and the pressure becomes normal pressure. The time for the heating treatment is also not particularly limited as long as the lithium type montmorillonite can be treated to have the above-mentioned cation exchange capacity. However, from the viewpoint of the efficiency of production, the time for the heating treatment is preferably 0.5 to 48 hours, and more preferably 1 to 24 hours.

The percentage water content of the lithium type montmorillonite before a heating treatment is preferably 1% to 12% by mass, and the percentage water content of a lithium-immobilized montmorillonite after a heating treatment is preferably 0.1% to 5% by mass.

(Ammonia)

The montmorillonite slurry of the present invention includes ammonia. Regarding the ammonia source, any one of an aqueous ammonia solution, gaseous ammonia, and liquid ammonia may be used; however, in the case of producing the slurry at normal temperature and atmospheric pressure, it is preferable to use aqueous ammonia.

The content of ammonia in the montmorillonite slurry of the present invention is 0.1 mmol or more, preferably 0.2 mmol or more, and more preferably 0.5 mmol or more, per gram of the lithium-immobilized montmorillonite in the montmorillonite slurry. When the content of ammonia is adjusted to the preferred value described above, a sufficient number of ammonia molecules penetrate between the layers of the clay crystals of the lithium-immobilized montmorillonite, and the solution dispersibility of the lithium-immobilized montmorillonite can be further enhanced. Also, in view of the generation of the foul ammonia odor and the production cost, the content of ammonia in the montmorillonite slurry is preferably 10 mmol or less, more preferably 5 mmol or less, and further preferably 2 mmol or less, per gram of the lithium-immobilized montmorillonite in the montmorillonite slurry.

The phrase "per gram of the lithium-immobilized montmorillonite" according to the present specification means, specifically, "per gram of montmorillonite in the slurry originating from the lithium-immobilized montmorillonite incorporated into the slurry". More particularly, the phrase means "per gram of the mass of a treatment product obtainable by extracting the lithium-immobilized montmorillonite incorporated in the slurry from the slurry, and treating the extracted montmorillonite at a temperature of 200° C. for 24 hours. The heating treatment is preferably carried out in an open system electric furnace. In this case, the relative humidity at the time of heating becomes 5% or less, and the pressure becomes normal pressure.

Furthermore, the amount of ammonia per gram of the lithium-immobilized montmorillonite is obtained by dividing the amount (mmol) of ammonia in the slurry by the mass of the lithium-immobilized montmorillonite in the slurry (that is, mass of a treatment product obtainable by extracting montmorillonite originating from the incorporated lithium-immobilized montmorillonite present in the slurry, and heat-treating the extracted montmorillonite at a temperature of 200° C. for 24 hours) (unit: g).

The content of ammonia in the montmorillonite slurry can be measured by an indophenol method, Kjeldahl's method, gas chromatography, or ion chromatography.

(Solvent)

The solvent included in the montmorillonite of the present invention is a mixed solvent of water and an organic solvent, and the organic solvent is preferably a polar organic solvent having a nitrile group or a ketone group and having a boiling point of 120° C. or lower. Examples of the organic solvent include acetonitrile (boiling point 81.6° C.) and methyl ethyl ketone (boiling point 79.6° C.), and these are used for the present invention. It is considered that the organic solvent enters between the layers of the lithium-immobilized montmorillonite together with ammonia and contributes to dispersion in a chain reaction.

The proportion occupied by the organic solvent in the total amount of the organic solvent and water in the montmorillonite slurry of the present invention is such that the solubility in water is the upper limit of the proportion, and the proportion is 10% by mass or more, preferably 15% by mass or more, and more preferably 20% by mass or more.

The upper limit of the proportion occupied by the organic solvent in the total amount of the organic solvent and water according to the present invention is 90% by mass or less, preferably 80% by mass or less, more preferably 70% by mass or less, particularly preferably 60% by mass or less, and most preferably 30% by mass or less.

The montmorillonite slurry of the present invention includes water. In a case in which an aqueous ammonia solution is used as an ammonia source, the water in the aqueous ammonia solution is the water in the slurry. Furthermore, the water in the slurry may include water that has been separately mixed in addition to the aqueous ammonia solution.

The proportion occupied by water in the total amount of the organic solvent and water in the montmorillonite slurry of the present invention is 90% by mass or less, preferably 85% by mass or less, and more preferably 80% by mass or less. When the content of water in the slurry is adjusted to be in the preferred range described above, a dispersibility enhancing effect caused by the polar organic solvent can be exhibited more effectively.

There are no particular limitations on the content of the lithium-immobilized montmorillonite in the montmorillonite slurry of the present invention, and the content can be regulated as appropriate according to the purpose. From the viewpoint of securing fluidity of the slurry and actually enabling kneading and stirring steps, the content of the lithium-immobilized montmorillonite in the montmorillonite slurry of the present invention is preferably 1% to 30% by mass, more preferably 2% to 25% by mass, further preferably 2% to 20% by mass, particularly preferably 2% to 15% by mass, and most preferably 3% to 10% by mass.

When the clay concentration of a slurry obtained in the present invention is a high concentration, the slurry can be used after being diluted to an intended concentration.

The slurry of the present invention can be produced into a slurry having a lower concentration by diluting the slurry using a polar organic solvent or a solvent compatible to water, for example, water, N,N-dimethylformamide, N-methylformamide, N,N-dimethylacetamide, N-methylpyrrolidone, dimethyl sulfoxide, methanol, ethanol, 1-propanol, 2-propanol, acetone, acetonitrile, methyl ethyl ketone, 1-butanol, or a mixed solvent of one kind or two or more kinds of these solvents.

(Other Components)

The slurry of the present invention may further include a silane coupling agent, a crosslinking agent, an organic polymer, a non-swellable silicate compound, silica, a surfactant, inorganic nanoparticles, and the like to the extent that does not substantially impair the effects of the present invention.

(Method of Producing Montmorillonite Slurry of the Present Invention)

Subsequently, production of the montmorillonite slurry of the present invention (hereinafter, referred to as method of producing the slurry of the present invention) will be explained.

The montmorillonite slurry of the present invention contains at least the above-described lithium-immobilized montmorillonite, ammonia, water, and an organic solvent.

In addition, in the present invention, the organic solvent described above contains at least one kind of organic solvent selected from the group consisting of acetonitrile and methyl ethyl ketone.

The montmorillonite slurry can be homogenized by mixing particular amounts of these components.

In regard to the production of the slurry of the present invention, the proportion occupied by the amount of incorporation of water in the total amount of incorporation of water and the organic solvent is 90% by mass or less, preferably 85% by mass or less, and more preferably 80% by mass or less.

Meanwhile, the proportion occupied by the amount of incorporation of water in the total amount of incorporation of water and the organic solvent is preferably 20% by mass or more, more preferably 30% by mass or more, and further preferably 50% by mass or more.

Furthermore, in regard to the production of the slurry of the present invention, the amount of incorporation of ammonia is 0.1 mmol or more, preferably 0.2 mmol or more, and more preferably 0.5 mmol or more, per gram of the amount of incorporation of the lithium-immobilized montmorillonite. The amount of incorporation of ammonia is preferably 10 mmol or less, more preferably 5 mmol or less, and further preferably 2 mmol or less, per gram of the amount of incorporation of the lithium-immobilized montmorillonite.

It is preferable that ammonia is mixed into the slurry by incorporating an aqueous solution of ammonia. In this case, water in the aqueous ammonia solution is incorporated as water into the slurry of the present invention. Water can also be separately incorporated, in addition to the water originating from the aqueous ammonia solution.

In regard to the production of the slurry of the present invention, the proportion occupied by the organic solvent in the total amount of the organic solvent and water in the montmorillonite slurry of the present invention is such that the solubility in water is the upper limit, and the proportion is 10% by mass or more, preferably 15% by mass or more, and more preferably 20% by mass or more.

The upper limit of the proportion occupied by the organic solvent in the total amount of the organic solvent and water is 90% by mass or less in the present invention, preferably 80% by mass or less, more preferably 70% by mass or less, particularly preferably 60% by mass or less, and most preferably 30% by mass or less.

It is preferable that the lithium-immobilized montmorillonite incorporated into the montmorillonite slurry of the present invention is in a powder form. That is, it is preferable to use a product obtained by subjecting a powder of a lithium type montmorillonite to the heating treatment described above, thereby immobilizing lithium ions, and adjusting the percentage water content to 0.1% to 5% by mass.

The method for mixing the various raw materials is not particularly limited, and the various raw materials can be mixed simultaneously or in an arbitrary order. Furthermore, on the occasion of mixing, a general battledore stirrer, a Homomixer, a universal mixing machine, a rotating and revolving mixer, an Eirich mixer, or the like can be used. Among them, a universal mixing machine or a rotating and revolving mixer, which can efficiently performing mixing even with a high-concentration slurry having a clay concentration of more than 20% by mass, can be suitably used.

There are no particular limitations on the temperature at the time of producing a slurry by mixing the various raw materials. The production is usually carried out at a temperature of 4° C. to 80° C.

The montmorillonite slurry of the present invention can form a clay film having excellent water resistance by forming a film of this montmorillonite slurry on a substrate and drying the film to a desired level under temperature conditions of 150° C. or lower. That is, the montmorillonite slurry of the present invention can be suitably used for the formation of a clay film that does not easily absorb water even when brought into contact with moisture and has high durability.

The clay film produced using the montmorillonite slurry of the present invention can be used as, for example, a packaging film, an electronic board, a flame-retardant film, a water vapor barrier film, an insulating film, or a coating film.

EXAMPLES

The present invention will be described in more detail based on examples given below, but the invention is not meant to be limited by these.

<Preparation of Lithium-Immobilized Montmorillonite>

A lithium type montmorillonite obtained by an ion exchange treatment of natural montmorillonite (KUNIPIA-M, manufactured by Kunimine Industries Co., Ltd.) was used as a lithium type montmorillonite as a raw material. 10 g of this lithium type montmorillonite was introduced into an electric furnace (muffle furnace, FO410, manufactured by Yamato Scientific Co., Ltd.) and was subjected to a heating treatment at 400° C. for 2 hours.

For the lithium type montmorillonite used as a raw material and the heat-treated article (lithium-immobilized montmorillonite), the cation exchange capacity (CEC) and the amount of leaching cations (LC) were measured.

The measurement of the CEC was carried out by the method described in Japan Bentonite Manufacturers Association Standard JBAS-106-77. The analysis of the LC was carried out by subjecting a leachate obtained by leaching using 1 M ammonium acetate at the time of the CEC measurement, to a cation analysis.

The measurement of the interlayer distance was carried out using an X-ray diffraction apparatus (manufactured by Rigaku Corp., MINIFLEX 600, X-ray source CuKα), and the interlayer distance was obtained at the d001 peak position.

The obtained results are shown in Table 1.

TABLE 1

| Measurement items | | Before heat treatment | After heat treatment |
|---|---|---|---|
| LC (meq/100 g) | Li | 113.2 | 20.8 |
| | Na | 2.8 | 0.9 |
| | K | 0.6 | 0.0 |
| | Ca | 2.0 | 1.7 |
| | Mg | 1.6 | 0.0 |
| | Total | 120.2 | 23.4 |
| CEC (meq/100 g) | | 99.8 | 6.6 |
| XRD | d(001)(angstrom) | 12.0 | 9.6 |

From Table 1, it can be seen that the CEC and the amount of Li ions after the heating treatment were reduced by immobilization, as compared to the values obtained before heating. Therefore, a decrease in the interlayer distance of the clay, which was equivalent to the hydrated layer fraction of the interlayer cations existing before the heating treatment, was observed, and the interlayer distance was 9.6 angstroms. Thus, it was found that the clay became a closed structure.

Hereinafter, the heat-treated article will be referred to as "Li-immobilized montmorillonite".

Preparation-1 of Slurry

Example 1

5 g of Li-immobilized montmorillonite A, 0.1 g of a 28% aqueous ammonia solution (manufactured by Kanto Chemical Co., Inc.), 74.9 g of distilled water, and 20 g of acetonitrile (manufactured by Kanto Chemical Co., Inc., special grade reagent) were introduced into a container, and the mixture was stirred and mixed using a stirring machine (trade name: TORNADO, manufactured by As One Corp.) with a disper blade for one hour. Thus, a slurry was obtained.

Example 2

A slurry was obtained in the same manner as in Example 1, except that the mixing amount of the aqueous ammonia solution used in Example 1 was changed to 0.5 g, and the mixing amount of distilled water was changed to 74.5 g.

Example 3

A slurry was obtained in the same manner as in Example 1, except that the mixing amount of the aqueous ammonia solution used in Example 1 was changed to 0.5 g, the mixing amount of distilled water was changed to 44.5 g, and the mixing amount of acetonitrile was changed to 50 g.

Comparative Example 1

A slurry was obtained in the same manner as in Example 1, except that the mixing amount of distilled water used in Example 1 was changed to 95 g, and the aqueous ammonia solution and acetonitrile were not incorporated.

Comparative Example 2

A slurry was obtained in the same manner as in Example 1, except that the mixing amount of acetonitrile used in Example 1 was changed to 95 g, and distilled water and the aqueous ammonia solution were not incorporated.

Comparative Example 3

A slurry was obtained in the same manner as in Example 1, except that the mixing amount of the aqueous ammonia solution used in Example 1 was changed to 0.01 g, and the mixing amount of distilled water was changed to 75 g.

Comparative Example 4

A slurry was obtained in the same manner as in Example 1, except that the mixing amount of the aqueous ammonia solution used in Example 1 was changed to 0.5 g, the mixing amount of acetonitrile was changed to 94.5 g, and distilled water was not incorporated.

Test Example-1

100 g of each of the slurries of Examples 1 to 3 and Comparative Examples 1 to 4 thus obtained was transferred to a glass cylinder bottle having a diameter of 4 cm and a height of 12 cm, and the slurry was left to stand for 24 hours at 25° C. Subsequently, an observation of the dispersed state of clay was made, and dispersion stability was evaluated according to the following evaluation criteria.
—Evaluation Criteria for Dispersion Stability—
  A: Layer separation did not occur, and excellent dispersion stability was obtained.
  B: Although layer separation occurred, the amount of precipitates was small.
  C: A large amount of precipitates was generated.
The obtained results are shown in Table 2.

As is obvious from Table 2 given above, it can be seen that the Li-immobilized montmorillonite was not dispersible in water (Comparative Example 1). Furthermore, even if acetonitrile was used as the solvent, in a case in which ammonia was not incorporated into the slurry (Comparative Example 2), in a case in which the content of ammonia in the slurry was lower than that defined in the present invention (Comparative Example 3), or in a case in which the proportion occupied by the organic solvent in the total amount of water and the organic solvent was more than 90% by mass (Comparative Example 4), results with inferior dispersion stability were obtained. Meanwhile, it was found that all of the slurries of Examples 1 to 3, which were slurries of the present invention, did not undergo layer separation and exhibited excellent dispersion stability.

Preparation-2 of Slurry

Example 4

A slurry was obtained in the same manner as in Example 2, except that acetonitrile used in Example 2 was not incorporated, and 20 g of methyl ethyl ketone (MEK, manufactured by Kanto Chemical Co., Ltd., special grade reagent) was incorporated.

Comparative Example 5

A slurry was obtained in the same manner as in Example 3, except that acetonitrile used in Example 3 was not incorporated, and 50 g of N,N-dimethylformamide (DMF, manufactured by Kanto Chemical Co., Ltd., special grade reagent) was incorporated.

Test Example-2

Using each of slurries of Example 4 and Comparative Example 5 thus obtained, dispersion stability was evaluated by the same method as that of Test Example-1.
The obtained results are shown in Table 3.

TABLE 2

|  | Li-immobilized montmorillonite Mixing amount (g) | Aqueous ammonia Mixing amount (g) | Content of ammonia | | Water Mixing amount (g) | Acetonitrile Mixing amount (g) | Dispersion stability |
|---|---|---|---|---|---|---|---|
|  |  |  | Content in slurry (mmol) | Content per gram of Li-immobilized montmorillonite (mmol) |  |  |  |
| Comparative Example 1 | 5 | 0 | 0 | 0 | 95 | 0 | C |
| Comparative Example 2 | 5 | 0 | 0 | 0 | 0 | 95 | C |
| Comparative Example 3 | 5 | 0.01 | 0.16 | 0.03 | 75 | 20 | C |
| Comparative Example 4 | 5 | 0.5 | 8.24 | 1.65 | 0 | 94.5 | C |
| Example 1 | 5 | 0.1 | 1.65 | 0.33 | 74.9 | 20 | A |
| Example 2 | 5 | 0.5 | 8.24 | 1.65 | 74.5 | 20 | A |
| Example 3 | 5 | 0.5 | 8.24 | 1.65 | 44.5 | 50 | A |

TABLE 3

| | Li-immobilized montmorillonite | Aqueous ammonia | Water | MEK | DMF | Dispersion stability |
|---|---|---|---|---|---|---|
| | | Content | | | | |
| Example 4 | 5 | 0.5 | 74.5 | 20 | 0 | A |
| Comparative Example 5 | 5 | 0.5 | 44.5 | 0 | 50 | A |

As shown in Table 3, even if MEK was used, a slurry having excellent dispersion stability similar to the case of acetonitrile was obtained.

Furthermore, even for Comparative Example 5 that is not included in the present invention, a slurry having stability could be obtained according to the evaluation of Test Example-1.

Therefore, the differences between the slurries of Comparative Example 5 and Example 3 were evaluated by the following Test Examples-3 and 4.

Test Example-3

The slurries of Example 3 and Comparative Example 5 were spread over a TEFLON (registered trademark) coating bat and were dried overnight under the conditions of 105° C. Thus, film-like dried products were obtained. The dried products were pulverized with a pulverizing machine (FORCE MILL FM-1, sold by Osaka Chemical Co., Ltd.), and thus powders were obtained. The powders thus obtained were dried for another two hours under the conditions of 105° C., and then a thermal analysis from 100° C. to 800° C. was performed using a differential type differential heat balance (manufactured by Rigaku Corporation, TG-DTA TG8120).

Figure 2:
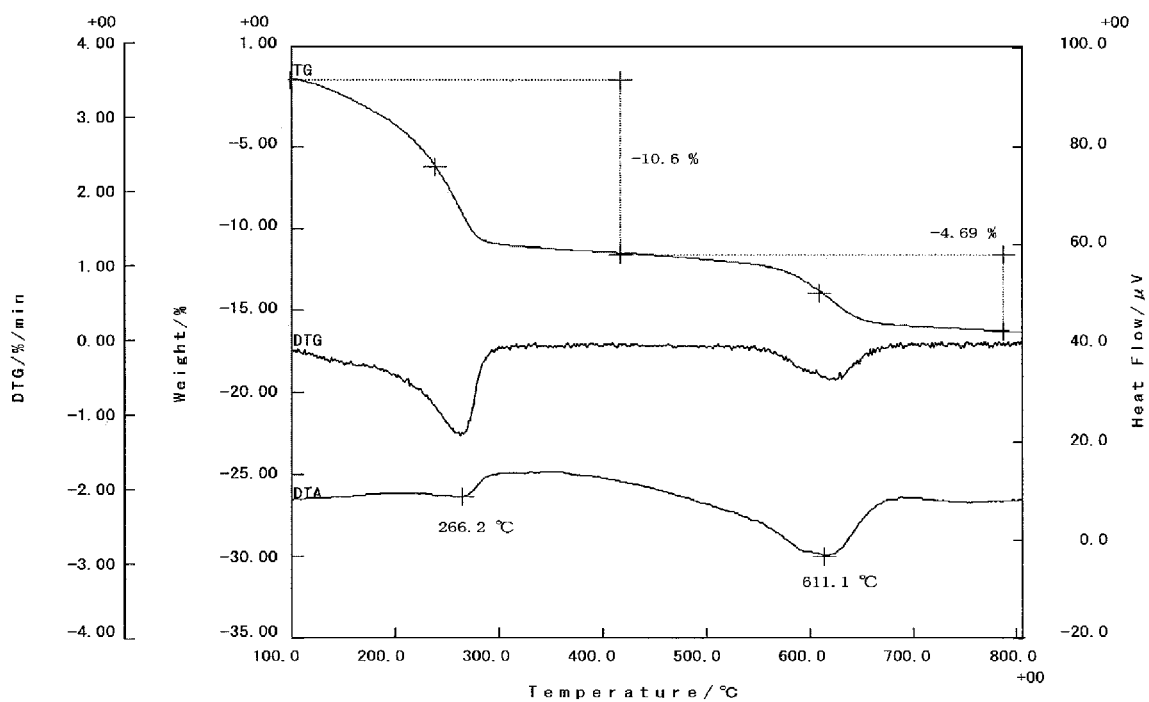
FIG. 2 is an analytic chart of thermogravimetry-differential thermal analysis (TG/DTA) for a dried powder obtained by drying the slurry of Comparative Example 5 in the Examples.
Figure 3:
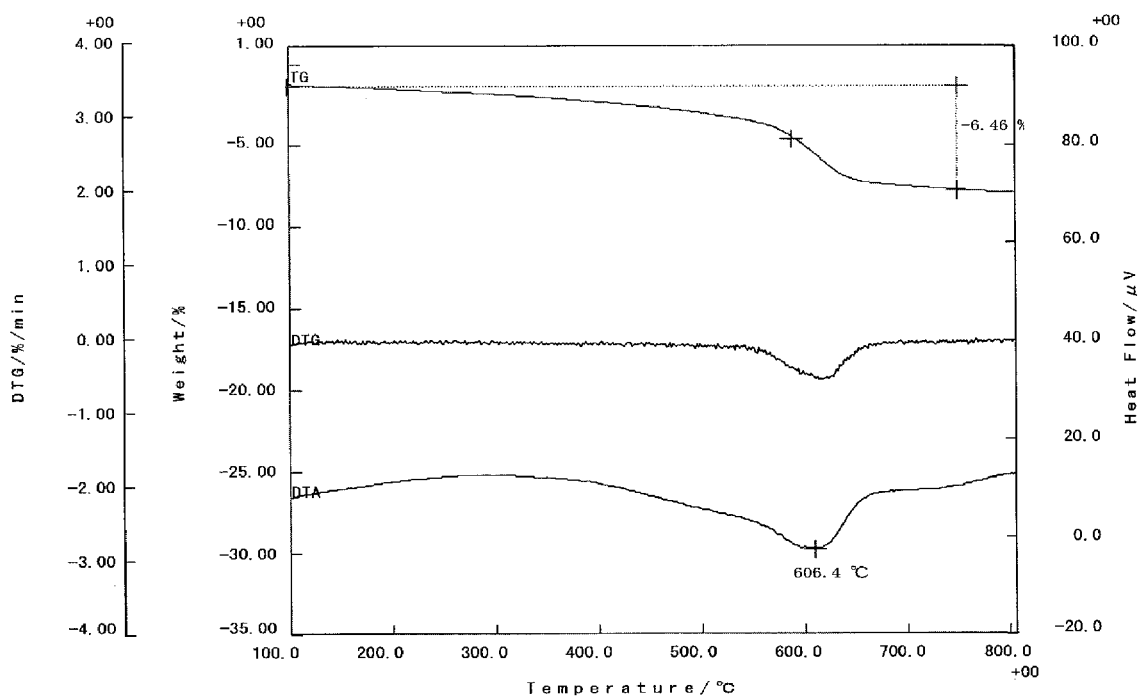
FIG. 3 is an analytic chart of thermogravimetry-differential thermal analysis (TG/DTA) for a dried powder obtained by drying the slurry of Example 3 in the Examples.

Thermal analysis results for dried powders of the Li-immobilized montmorillonite used as a starting raw material and the slurries of Example 4 and Comparative Example 5 produced according to Test Example-3 are shown in FIGS. 1 to 3.

FIG. 1 is a measurement chart of a thermogravimetry-differential thermal analysis (TG/DTA) of a dried powder of the Li-immobilized montmorillonite used as a starting raw material. FIG. 2 is a measurement chart of a thermogravimetry-differential thermal analysis (TG/DTA) of a dried powder of the slurry of Comparative Example 5. FIG. 3 is a measurement chart of a thermogravimetry-differential thermal analysis (TG/DTA) of a dried powder of the slurry of Example 4.

Three plot curves in each measurement chart represent a DTA (differential thermal analysis) curve in the lower part, a DTG (differential curve of TG) in the middle, and a TG (thermogravimetry) curve in the upper part.

The vertical axis for the DTA (differential thermal analysis) curve is "Heat Flow/μV" on the right-hand side, and the vertical axis for the DTG (differential curve of TG) is "DTG/%/min" on the leftmost side. The vertical axis for the TG (thermogravimetry) curve is the second vertical axis from the left-hand side, [Weight/%].

As is obvious from FIG. 1, in regard to the Li-immobilized montmorillonite itself as a starting raw material, weight reduction in TG and an endothermic peak in DTA resulting from OH dehydration from the crystals are observed at near 600° C. In regard to the dried powder obtained from the slurry of Example 3 of FIG. 3, only weight reduction at near 600° C. is observed, similarly to the Li-immobilized montmorillonite itself as a starting raw material described above. Meanwhile, in regard to the dried powder obtained from the slurry of Comparative Example 5 of FIG. 2, weight reduction of about 10% over the temperature range of from 100° C. to 300° C. (TG curve) and an endothermic curve at 266° C. (DTA curve) are observed, in addition to the observation of OH dehydration at near 600° C. This represents the existence of DMF that remained between clay layers and could not be sufficiently removed by heating. Thus, easy dryability at low temperature of the slurry of the present invention can be seen.

Test Example-4

The slurries of Example 3 and Comparative Example 5 each were cast on a terephthalate (PET) film using a casting knife, and the slurries were dried for 3 hours at 105° C. After the drying, the dried slurries were detached from the PET film, and thus molded bodies having a thickness of 20 μm were obtained as self-supporting films. Film specimens that each measured 4 cm on each side were cut out and were immersed in a glass Petri dish containing distilled water. Subsequently, the presence or absence of disintegrability in water up to 24 hours was checked by visual inspection.

As a result, in the film specimen produced from the slurry of Example 3, even after immersion for 24 hours, no substantial change was observed compared to the state immediately after immersing the specimen in a glass Petri dish containing distilled water, and the specimen retained its shape. In contrast, in the film specimen produced from the slurry of Comparative Example 5, the film was disintegrated in water into several relatively large fragments and a plurality of fine fragments. It is speculated that in the film specimen produced from the slurry of Comparative Example 5, the film attracted water into between layers and gradually swelled, due to the presence of DMF remaining between the layers, and the film was disintegrated in water over time.

Similarly, also for the respective slurries of Examples 1, 2 and 4, film specimens were produced from these slurries and were subjected to the evaluation of Test Example-4. As a result, similarly to the film specimen produced from the slurry of Example 3, the films all retained their shapes even after immersion for 24 hours.

Having described our invention as related to the present embodiments, it is our intention that the invention not be limited by any of the details of the description, unless otherwise specified, but rather be construed broadly within its spirit and scope as set out in the accompanying claims.

This non-provisional application claims priority under 35 U.S.C. § 119 (a) on Patent Application No. 2016-226341 filed in Japan on Nov. 21, 2016, which is entirely herein incorporated by reference.

The invention claimed is:

1. A montmorillonite slurry, comprising:
   a lithium-immobilized montmorillonite having a cation exchange capacity of 50 meg/100 g or less;
   ammonia;
   water; and
   an organic solvent,
   wherein the organic solvent is at least one kind of organic solvent selected from the group consisting of acetonitrile and methyl ethyl ketone,
   wherein the proportion occupied by the organic solvent in the total amount of the water and the organic solvent in the slurry is 10% by mass or more and 90% by mass or less; and wherein the content of ammonia in the slurry is 0.1 mmol or more per gram of the lithium-immobilized montmorillonite in the slurry.

2. The montmorillonite slurry according to claim 1, wherein the lithium-immobilized montmorillonite is obtained by subjecting a lithium type montmorillonite to a heating treatment at 180° C. to 600° C.

3. A clay film using the montmorillonite slurry according to claim 1.

4. A method of producing a montmorillonite slurry, comprising mixing at least a lithium-immobilized montmorillonite having a cation exchange capacity of 50 meq/100 g or less, ammonia, water, and an organic solvent,
   wherein the organic solvent is at least one kind of organic solvent selected from the group consisting of acetonitrile and methyl ethyl ketone,
   wherein the proportion occupied by the organic solvent in the total amount of the water and the organic solvent in the slurry is 10% by mass or more and 90% by mass or less, and
   wherein the mixing amount of ammonia is 0.1 mmol or more per gram of the lithium-immobilized montmorillonite.

5. The method of producing a montmorillonite slurry according to claim 4, herein the lithium-immobilized montmorillonite is obtained by subjecting a lithium-type montmorillonite to a heating treatment at 180° C. to 600° C.

6. The method according to claim 4, wherein an aqueous ammonia solution is mixed as the ammonia.

\* \* \* \* \*